United States Patent [19]
Coutelle et al.

[11] Patent Number: 5,948,156
[45] Date of Patent: *Sep. 7, 1999

[54] SUPPLEMENTARY AGENT FOR MINERAL BINDER SYSTEMS

[75] Inventors: Helmut Coutelle, Freising; Klaus Dziwok, Moosburg, both of Germany

[73] Assignee: Sud-Chemie, AG, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/903,708

[22] Filed: Jul. 31, 1997

Related U.S. Application Data

[63] Continuation of application No. 08/410,826, Mar. 27, 1995, abandoned.

[30] Foreign Application Priority Data

Mar. 28, 1994 [DE] Germany ............... 44 10 728

[51] Int. Cl.⁶ .................................. C04B 14/10
[52] U.S. Cl. ................. 106/486; 106/606; 106/706; 106/718; 106/DIG. 4
[58] Field of Search ............... 106/486, 416, 106/600, 606, 706, 718, DIG. 4

[56] References Cited

U.S. PATENT DOCUMENTS

| | | | |
|---|---|---|---|
| 3,759,729 | 9/1973 | Fahn | 106/803 |
| 4,378,249 | 3/1983 | Beale et al. | 106/632 |
| 4,447,267 | 5/1984 | Chesney, Jr. et al. | 106/720 |
| 4,696,699 | 9/1987 | Harriett | 106/632 |
| 4,797,158 | 1/1989 | Harriett | 106/632 |
| 4,886,550 | 12/1989 | Alexander | 106/706 |
| 5,161,915 | 11/1992 | Hansen | 405/129 |
| 5,275,508 | 1/1994 | Hansen | 405/129 |
| 5,385,429 | 1/1995 | Hansen | 405/129 |
| 5,389,146 | 2/1995 | Liao | 106/DIG. 4 |
| 5,423,911 | 6/1995 | Coutelle et al. | 106/416 |
| 5,525,009 | 6/1996 | Hansen | 405/129 |
| 5,588,990 | 12/1996 | Dongell | 106/716 |
| 5,637,144 | 6/1997 | Whatcott et al. | 106/718 |
| 5,650,004 | 7/1997 | Yon | 106/719 |

FOREIGN PATENT DOCUMENTS

| | | |
|---|---|---|
| 0409774 | 12/1994 | European Pat. Off. |
| 2715305 | 10/1977 | Germany |
| 219170 | 2/1985 | Germany |
| 3606313 | 9/1987 | Germany |
| 3610755 | 10/1987 | Germany |
| 4205354 | 2/1992 | Germany |
| 4213348 | 12/1993 | Germany |
| 4241714 | 6/1994 | Germany |
| 61-006164 | 1/1986 | Japan |
| 63-006044 | 1/1988 | Japan |
| 138945 | 6/1988 | Poland |
| 152037 | 10/1990 | Poland |

OTHER PUBLICATIONS

Firmenschrift der Sud–Chemie Ag, Technische Information, Tixton CV 15, pp. 1–3 (no date available).

*Primary Examiner*—Paul Marcantoni
*Attorney, Agent, or Firm*—Scott R. Cox

[57] ABSTRACT

A supplementing agent for mineral binder systems is disclosed, especially for the construction industry, containing at least 1 finely divided, swellable layer silicate and possible at least 1 other additive, the proportion of the swellable layer silicate being more than 60 wt. % and the swelling volume of the layer silicate being around 5–50 ml, in terms of a suspension of 2 g layer silicate in 100 ml water.

19 Claims, No Drawings

SUPPLEMENTARY AGENT FOR MINERAL BINDER SYSTEMS

This is a continuation of application Ser. No. 08/410,826, filed Mar. 27, 1995, abandoned.

BACKGROUND OF INVENTION

Construction mixtures like mortar, screed compositions, plaster, construction adhesive, etc., besides containing binders like cement, lime, or gypsum, and aggregates like sand or rock meal, usually also contain additives like water repellents, water retention agents, retarders, accelerators, air entraining agents, liquefiers, etc.

The quantities of these individual additives in the overall mixture are usually under 1 wt. %, often even below 0.1 wt. %. The agents differ in their physical properties, and often are quite strikingly different from the other components of the binder mixture, i.e., they sometimes have a much lower specific gravity or a lower bulk weight or they are present as a liquid. These properties make it hard to distribute the additives optimally in the binder mixture. For example, the physical mixture of various small amounts of very light powders with large amounts of relatively heavy components, as are present in the binders and aggregates, presents great problems and requires a lot of mixing expense. On the other hand, liquid additives can result in clumping or, if they are dissolved in water, hardening of the binder.

The homogenous mixing in of additives or supplementary agents therefore requires a very high expenditure of equipment and machinery. The high effectiveness of these additives—documented, for example, by the use of a quantity of as little as 0.05 wt. %— does not allow fluctuation in concentration of these agents. Therefore, one possible solution is to add them not in pure form, but as "diluted" material, disposed on a carrier.

Thus, EP-A-0 409 774 describes a mixture of lignosulfates and polyphosphates, as well as a processing agent, which is suitable as a retarder system for hydraulically hardening cements. A mineral component, such as vermiculite, perlite, bentonite or montmorillonite, in an added amount of around 30–60 wt. %, is also used as an aggregate. This mineral component has the property of adsorbing water and swelling. No other effects are observed or specified.

JP-A-61 006 164 describes a granulate that contains 20–90 wt. % of a supplementary agent (a melamine sulfonate-formaldehyde condensate), which has been produced with 10–80 wt. % bentonite as a pelleting agent.

The homogeneous mixing in of liquid additives is also a problem. Liquids are frequently converted to a powder-like, pourable form, in order to facilitate such mixing. There is the known use of pyrogenic silicas, which are suitable for "solidification" of liquids by virtue of their high specific surface and their large pore volume. But these carrier materials have the disadvantage of contributing nothing to the binder system and being present as inert fillers.

Wall sealing compounds are known from DE-A-3 610 755, which contain clay minerals with layer lattice structure that are capable of swelling, such as bentonites and montmorillonites. These are preferably used in the form of sodium bentonite, which has large swelling capacity. The clay minerals are the main ingredients and not a supplementary agent for the wall sealing compounds.

A dry mixture is known from DE-C-4 205 354 for the production of construction material suspensions that can be hydromechanically delivered. This mixture contains as a primary ingredients 10–80 parts by weight of a hydraulic binder based on cement clinker, 10–80 parts by weight of filter ash from coal furnaces, and 1–20 parts by weight of swellable clays. Highly swellable clays are preferred.

A binder mixture is known from DE-C-4 213 348 for the single-step production of sealing walls, containing as the primary ingredients 30–82.7% by mass of foundry sand, 2.0–1.0% by mass of a hydroxyl-ion-forming seed ingredient, and 15–65.0% by mass of clay minerals. Thus, the clay minerals are present in a very high proportion. Nothing is said about their swelling ability.

A coating composition for masonry is known from DE-A-2 715 305, containing a carrier material component and a pigment-extender-component, being characterized in that it contains a smectite clay and a water soluble polymer. The smectite clay is preferably present in a quantity of around 2–5 wt. %. There is no information about the swelling capacity of the smectite clay.

A process for the production of frost-resistant mortar and concrete is known from DE-B-1 082 544, in which air pore forming agents and finely pulverized adsorbents such as silica and aluminum compounds, e.g., zeolites, permutites, bentonite, kaolin, aluminum oxide, or active silicic acid are added to the mortar or the concrete or the components thereof. These additives are supposed to increase the frost resistance by acting on the air pore forming agents. There is no information on the swelling capacity of the adsorbent.

DE-C-736 842 and DE-C-764 999 disclose a method for hardening and tempering mortar and concrete, being characterized in that, before or during the processing of the mortar and concrete materials, water-soluble lignin derivates, as well as kieselguhr or other surface-active silicas and/or corresponding silicates (e.g., bentonite) are added. The last-mentioned additives are supposed to increase the compressive strength of the concrete and reduce the water permeability, supposedly because of a large specific surface. There is no mention of the swelling capacity of the additives.

DE-C-576 766 concerns a method of production of colored plaster mortars, in which colored, colloidally dispersible, natural or artificial silica gels in powder form are added to high-boiling organic compounds. In the case of bentonite which is used as an example, the bentonite is an acid-activated kind, since natural or alkaline activated bentonite contains no silica gel.

AT-A-280 134 concerns a mortar or concrete additive, which consists of a mixture of bentonite and air-introducing and/or plasticizing agents. The swelling ability of the bentonite is not indicated.

An insulating mixture based on cement and sand is known from AT-A-268 132 (equivalent to CH-A-459 858), which contains, as an additive, an activated alkali bentonite with a swelling ability of up to 1000% in a quantity of up to 15 wt. %, as well as another component with hydraulic properties like cement, preferably fly ash, as well as surface-active substances and familiar quick-setting agents. The use of highly swelling alkali bentonites in large quantities, however, causes formation of dry cracks.

A surface-active cement supplementing agent is known from CH-A-463 357, which contains finely divided, solid, natural or synthetic, inorganic, oxygen-containing silicon compounds with a coating of finely divided, surface-active, nonionic addition products of ethylene oxide.

The use of highly swelling bentonite suspensions in conjunction with cement is known from the company literature of Sud-Chemie AG, Technical Information Department, TIXOTON CV 15, pp. 1–3, the bentonite being used in amounts of 17.5%.

The purpose of the invention is to provide supplementary agents or mixtures thereof for mineral binding systems in a form which enables easy and homogeneous mixing of even the smallest quantities with the fewest possible number of mixing operations in the production of the binder systems. Furthermore, the supplementing agent should not remain without effect in the system, like an inert filler, but rather improve the application properties of the finished system.

SUMMARY OF INVENTION

This purpose is accomplished, according to the invention, by providing a supplementing agent or a supplementing agent mixture for mineral binder systems that contains at least one finely divided, swellable layer silicate, the proportion of the swellable layer silicate being more than 60 wt. % and the swelling volume of the layer silicate being around 5–50 ml, in terms of a suspension of 2 g of layer silicate in 100 ml of water. By a finely divided layer silicate is generally meant a product exhibiting a screen oversize of no more than 20 wt. % for a mesh of 90 $\mu$m.

The proportion of the supplementing agent in the mineral binder system is generally around 0.01–5.0 wt. %, preferably around 0.01–3 wt. %, especially around 0.01–0.9 wt. %, in terms of the total solids.

The swelling volume is determined as follows:

A graduated 100 ml cylinder is filled with 100 ml of distilled water. 2 g of the layer silicate being measured are slowly applied to the surface of the water with a spatula in portions of around 0.1–0.2 g. The portion is allowed to sink before the next portion is supplied. After the 2 g have been added and have sunk to the bottom of the cylinder, the height of the swollen substance in the cylinder is read off in mm/2 g after one hour.

Because of the pronounced layered structure, the swellable layer silicate used according to the invention, even in slight amounts of 0.1–1.0 wt. %, accomplishes a plasticization and, thus, an easier workability of binder systems like plasters, mortars, lime floors, etc. The internal lubricating action of the silicate platelets as they slide over each other also favorably influences the abrasion of the pumps and the pump pressure, e.g., that of the conditioning and processing machinery, though without reducing the yield limit and non-sag properties of the moist binder mass.

The invention also deals with a method of production of the above-described supplementing agent. The process is characterized in that the other additive or additives, in solid or liquid form, are deposited on the swellable layer silicate (s), which may be used as pretreated powder or as natural, freshly mined material. The latter still contains around 20–60 wt. % water. If the layer silicate is available in a form that is not swellable (e.g., bentonite in the calcium form), the raw material can be previously converted to the desired swelling form by ion exchange with other suitable cations. In similar fashion, a layer silicate with too high swelling ability (e.g., bentonite in the sodium form), can be placed in the desired range of swelling ability by ion exchange with suitable, preferably polyvalent cations. The desired range of swelling capacity can also be set for example by a combination of a sodium bentonite with a calcium bentonite.

DESCRIPTION OF THE INVENTION

According to the invention, the swellable layer silicate basically consists of a mineral of the smectite group, such as bentonite, montmorillonite, hectorite, saponite, beidellite, sauconite, etc, of natural or synthetic origin, or mixtures of these minerals. For reasons of economy, bentonite or hectorite are preferred.

The layer silicates of the smectite group, which normally have high swelling ability, are not in themselves suitable. Because of the high swelling ability, there is the danger of cracks occurring during hardening when more than 1.0 wt. % is used in the binder system, because the layer silicate has excessive shrinkage. This property, thus far, has restricted the use of large amounts of swellable layer silicates. Experience teaches that, although the formation of cracks can be suppressed by adding fiber-like material, such as cellulose fibers, polyethylene fibers, etc, these substances do not contribute to the plasticization of the binder.

On the other hand, if the swellable layer silicate has too little swelling ability, the specific surface required for the adsorption of liquid or dissolved additives, for example, is not available. Furthermore, the positive effects of the swellable layer silicate on the processing properties (lubrication action, non-sag properties, plasticization) are then reduced.

In this case, the swellable layer silicate must be placed in the desired form by alkaline activation, e.g., through ion exchange with alkaline cations. Thus, for example, with calcium bentonites as the starting material, the swelling ability can be enhanced by ion exchange with sodium ions, e.g., from sodium carbonate, sodium bicarbonate, sodium phosphates, sodium-water glass, etc, by the desired amount.

On the other hand, with the naturally high-swelling sodium bentonites, an ion exchange with divalent cations, such as calcium ions, or trivalent cations, such as aluminum ions, etc, is capable of reducing the swelling ability by the desired amount. Preferably, the swellable layer silicate has a swelling volume of around 5–40 ml/g, especially 10–30 ml/g.

Limitation of the swelling volume to the middle ranges can be seen in the case of bentonite, also in the ratio of multivalent to monovalent exchangeable interlayer cations. An extensive presence of monovalent interlayer cations, especially sodium ions, causes a high swelling capacity which allows complete detachment of the silicate lamellae from one another. If this swelling is too high, the danger of formation of shrinkage cracks in the mineral binder systems during drying and setting is very high. In contrast, a predominant presence of multivalent interlayer cations, especially calcium and magnesium ions, prevents the detachment of the silicate lamellae from one another; this leads to low swelling volume, and also to reduced flexibility of the mineral binder system. A well balanced ratio of multivalent and monovalent interlayer cations results in the fact that by means of shearing or kneading, strips of silicate lamellae are formed in which the individual silicate lamellae are still in part bridged by multivalent cations and are held together, while the individual strips can be detached from one another due to the presence of the monovalent cations in between. This strip structure in a mineral binder system yields high flexibility without increasing the tendency to form cracks due to overly high swelling capacity.

Combinations of high-swelling layer silicates with less-swelling extender silicates, like vermiculite, illite, mica, pyrophyllite, kaolin, or talc, are also suitable for this purpose. However, it is important that all these materials have a distinct layered or lamellar structure, so as not to reduce the internal lubricating action and plasticization.

Because of their high specific surface and their natural water-retention ability, the layer silicates used according to the invention are well suited to adsorb even liquid additives and transform them to the powder-like state. Because of the high specific gravity of the layer silicates, being around 2.6+/−0.5 g/cm$^3$, the coated materials can be easily and homogeneously blended with the binders and aggregates.

Whereas in familiar applications layer silicates like bentonite are used essentially as inert additives in various added amounts, the layer silicate represents an essential ingredient of the mixtures according to the invention. Therefore, the proportion of the layer silicate(s) is generally more than 80 wt. %, preferably more than 90 wt. %. The other additive or additives are generally present in an amount less than 40 wt. % preferably less than 20 wt. %, especially less than 10 wt. %. In general, the weight ratio of layer silicate to additive is on the order of 80:20 to preferably 90:10. The proportion of the additives can be as low as 0.1 wt. %.

Despite this low proportion of other additives and their depositing on the layer silicate, their action is neither influenced nor restricted.

The invention also deals with a method of production of the above-described supplementing agent. The process is characterized in that the other additive or additives, in solid or liquid form, are deposited on the swellable layer silicate (s), which may be used as pretreated powder or as natural, freshly mined material. The latter still contains around 20–60 wt. % water. If the layer silicate is available in a form that is not swellable (e.g., bentonite in the calcium form), the raw material can be previously converted to the desired swelling form by ion exchange with other suitable cations. In similar fashion, a layer silicate with too high swelling ability (e.g., bentonite in the sodium form), can be placed in the desired range of swelling ability by ion exchange with suitable, preferably polyvalent cations. The desired range of swelling capacity can also be set for example by a combination of a sodium bentonite with a calcium bentonite.

The other additives are either kneaded into the moist layer silicate or placed in dissolved form, with the dry, ground layer silicate, serving as a carrier. Powder-like supplementing agents can be homogeneously blended with the carrier material in the usual mixing devices, and/or the mixture can be produced by grinding the ingredients together.

The method chosen for mixing depends on the stability of the supplementing agents, based on characteristics such as temperature stability, shear stability, etc. Preferably, the mixtures are used in finely ground form, dried to a water content under 50 wt. %.

The advantage in the use of swellable layer silicates as carrier instead of other binder mixture ingredients such as cement, lime, sand, etc., consists in its finely divided nature, absorbency, and reversible release of water without chemical changes. If the binder was used as a carrier of the other additives, it would harden during the moist kneading and become unusable. Sand is not absorbent enough to be used as filler for the moist working in of additives. For both materials, there is a danger of separation of the mixture of finely divided additive powders, because their specific gravity is too high.

EXAMPLES

The advantages of the invention will be explained more closely by the following examples.

Example 1

Fifteen parts of sodium tripolyphosphate powder (retardant) were mixed with 85 parts of dry sodium bentonite powder (bentonite C, swelling volume 73 ml.). Portland cement PZ 35 F was added to the mixture. The hardening time was checked per DIN 1164, part 5. The results are shown in Table I.

TABLE I

| Additive | Amount Used Wt. % | Start (min) of Hardening Time (%) | End (min) of Hardening Time (%) |
|---|---|---|---|
| Blank | — | 110 | 180 |
| bentonite C | 1 | 140 | 200 |
| bentonite C | 2 | 175 | 235 |
| mixture | 1 | 260 | 300 |
| mixture | 2 | 350 | 580 |
| retardant | 0.15 | 265 | 318 |
| retardant | 0.3 | 362 | 595 |

Bentonite C alone has an inadequate retarding effect, while the retardant has retarding action even in mixtures with bentonite.

Example 2

Three parts of air entraining agent powder (sodium alkylsulfonate powder), 3 parts of liquefier powder (melamine formaldehyde condensate, sulfonate powder) and 94 parts of dry bentonite powder B (partially activated calcium bentonite, swelling volume 25 ml) were mixed together. The mixture was added to a first coat mixture (Koch-Marmorite test system). The apparent density and air pore content of the first coat was determined for an addition of 0.2 wt. % (standard method of the Institute of Lime and Mortar Research, Cologne).

The results are given in Table II.

TABLE II

| Additive | Apparent Density (kg/dm$^3$) | Pore Content (vol. %) |
|---|---|---|
| Blank | 1.92 | 11.5 |
| Bentonite B | 1.91 | 13.0 |
| Mixture | 1.80 | 18.0 |
| Pore Former/ Liquefier alone (0.012%) | 1.79 | 18.3 |

The pore former also produced air pores when mixed with bentonite.

Bentonite by itself provided a slight increase in the content of air pores, which was attributable to the stabilizing action (yield limit).

Example 3

Five parts of liquefier (melamine formaldehyde condensate, sulfonate powder) were mixed with 95 parts of bentonite powder B (swelling volume 25 ml). The mixture was added to a lime mortar mixture (Sacret company) in a quantity of 0.5 wt. %. The viscosity of the lime mortar was measured at low and high shear rate and from this measurement, the index of structural viscosity was determined. The mortar was prepared with 30 wt. %, water mixed 40 sec with the spatula, and stirred 2 min with a basket agitator at 750 RPM. Next, the viscosity was measured after 1 min rotation at 3 RPM in a Haake Rotovico RV 11 (rotating body UV II P). After a rest intermission of 1 min, the viscosity was determined after another minute of rotation at 162 RPM. The structural viscosity factor was obtained from the quotient of the viscosities at 3 RPM and 162 RPM.

The results are presented in Table III.

TABLE III

| Batch | Structural viscosity factor (3/162 RPM) |
| --- | --- |
| Blank | 20.2 |
| bentonite B | 20.8 |
| Mixture | 18.0 |
| Liquefier | 15.1 |

The liquefier also worked to liquefy in a mixture with bentonite B.

Example 4

A Portland cement/sand mixture (1:3) was mixed with 5 wt. % of bentonite B or with bentonite B with 5 wt. % of the liquefier of Example 3. The required water consumption to achieve an identical processing consistency was measured (standard method of the Institute of Lime and Mortar Research, Cologne).

The results are presented in Table IV.

TABLE IV

| Sample | Water Requirement (%) |
| --- | --- |
| Blank | 20 |
| bentonite B | 25 |
| bentonite B with 5% liquefier | 21 |
| Liquefier alone (0.25%) | 17 |

Bentonite alone, as expected, increased the water requirement because of its swelling capacity in water. The liquefier reduced the water consumption of the mortar and thus also acted to liquefy in mixture with bentonite.

Example 5

Three parts of ethylhydroxyethylcellulose—(EHEC)—powder were mixed with 6 parts of liquefier (melamine formaldehyde condensate sulfonate powder) and 91 parts of bentonite powder B. The mixture was added in the amount of 0.5 wt. % to a lime mortar mixture (Sacret Company). The water retention capacity was determined as follows in the lime mortar:

A cellulose cardboard (Schleicher and Schuell No. 2294) with a diameter of 110 mm was weighed and placed on a glass plate. On this was put a separating paper (Schleicher & Schuell No. 0988) with a diameter of 110 mm, weighing once again. On this arrangement was placed a plastic ring with an inner diameter of 90 mm, an outer diameter of 110 mm, and a height of 15 mm, again weighing. Into this arrangement were filled 150 g of the lime mortar mixture (null sample), stirred in a mixing beaker of 0.5 1 or the above-mentioned mixture up to the rim of the plastic ring. The introduced quantity was weighed. After 10 min, the mixtures are separated from the cellulose cardboard, which is immediately weighed again.
Calculation: WRV=100−[100·A(1+W/F)/(W/F·B)]
WRV=Water retention ability in percent.
W/F=Water/Solid factor
(total water quantity of the lime mortar in the plastic ring corresponds to 100%)
A=Water uptake of the cellulose cardboard and the separating paper (the latter has a uniform water uptake of 0.16 g) in g
B=The quantity of mortar placed in the plastic ring in g The results are presented in Table V.

TABLE V

| Additive | Water retention ability after 10 min (%) |
| --- | --- |
| Blank | 77 |
| bentonite B | 81 |
| mixture without EHEC | 75 |
| mixture with EHEC | 82 |
| EHEC alone (0.015%) | 83.5 |

Bentonite itself had little water retention ability. The liquefier in the mixture with bentonite had a liquefying effect. The cellulose ether also enhanced the water retention ability in mixture with bentonite.

Example 6

2 or 4 wt. % of sodium carbonate were kneaded with bentonite B in the moist condition (water content around 35 wt. %) for 5 min, dried at 75° C. in a circulating air oven and ground up (particle size not more than 10%>90 μm). The mixture in a quantity of 3 parts by weight was added to a mineral tile adhesive with the following composition
40.0 parts by weight cement PZ 45F
57.2 parts by weight quartz sand 0.1–0.25 mm
0.5 parts by weight Walocel MW 6000 PFV 50 L® (Wolff-Walsrode Co.)
3.0 parts by weight bentonite B The open time of the mineral tile adhesive was measured by the following method:

The tile adhesive was prepared with a basket mixer (at 300 RPM, 5 min digestion time). This tile adhesive mixture was applied to a concrete paving slab with a spatula. Into the mixture were set stone china tiles with dimension of 5.5×5.5 cm at intervals of 5 min, up to a total of 30 min. The stone china tiles were each loaded with a weight of 2 kg for 10 sec and then removed. The adhesive sticking (wetting) to the back of the tile was then determined in percent of the tile surface.

The results were presented in Table VI.

TABLE VI

| | Wetting of the Tiles (%) After: | | | |
| --- | --- | --- | --- | --- |
| Additive | 5 min | 10 min | 15 min | 20 min |
| bentonite B | 100 | 90 | 5 | 0 |
| bentonite B + 2% Na$_2$CO$_3$ | 90 | 10 | 0 | 0 |
| bentonite B + 4% Na$_2$CO$_3$ | 50 | 0 | 0 | 0 |

The setting accelerator Na$_2$CO$_3$ also acted to shorten the open time in mixture with bentonite.

Example 7

95 wt. % of bentonite B were mixed with 5 wt. % of the liquefier of Example 2. The mixture in a quantity of 3 wt. % was added to a tile adhesive with the composition of Example 6. The slip-off weight of the tile, i.e., the non-sag behavior, was determined by the following method:

The tile adhesive was prepared with a basket mixer (at 300 RPM, 5 min digestion time). The tile adhesive mixture was applied perpendicularly to a concrete paving slab with a spatula. Next, a stone china tile with dimensions 15×15 cm (284 g) was put in place and loaded with a 5 kg weight for 5 sec, so that the tile was completely wetted. After this, the slab was placed vertically without impact and the starting point was marked. The slip-off distance was measured with a ruler; if there was no slippage, the stone china tile was loaded with various weights until slippage occurred.

The results are presented in Table VII.

TABLE VII

| Sample | Slip-off weight of the tile |
| --- | --- |
| Blank | 568 g |
| bentonite B | 1246 g |
| bentonite and 5% liquefier | 284 g |

Bentonite enhanced the non-sag property of the tile adhesive. Adding the liquefier reduces the non-sag ability.

Example 8

0.3 wt. % of bentonite B was mixed into lime mortar (Sacret Co.). The sample and the null sample were adjusted with water to a consistency of 17 cm each. The relative viscosity under high shear was measured. For this, a Haake Rotovisco RV 11 (measurement device RS) was used. The scale divisions measured after 1 min of rotation at 486 RPM were read off as the viscosity.

The results are presented in Table VIII.

TABLE VIII

| Sample | Water added (%) | Consistency (cm) | rel. viscosity at 486 RPM (scale divisions) (Haake RV11) |
| --- | --- | --- | --- |
| Blank | 21.2 | 17.0 | 84 |
| bentonite B | 22.6 | 17.0 | 53 |

With the non-sag ability adjusted the same, the sample with bentonite offered lower viscosity under high shear (e.g., pumping, smoothing) and, thus, exhibited easier workability.

Example 9

0.1 wt. % of bentonite B was mixed into a lime cement plaster (Grafix Co.) and spray tests were carried out with a plaster pump.

The results are presented in Table IX.

TABLE XI [SIC!]

| | Pump pressure (bar) | Current Consumption (A) |
| --- | --- | --- |
| Blank | 27 | 15.4 |
| With 0.1 wt. % bentonite B | 23.6 | 12.6 |

Bentonite without additives produced an easier pumping and workability of plaster. Thus, the wear on the pump was also reduced.

Example 10

To a construction mixture (Solnhofer Plaster and Masonry Binder DIN 4211) were added 1 wt. % each of bentonite A (calcium bentonite), B, and C, and hectorite. The same quantity of water (31 parts by weight of water, adjusted to 100 parts of solid) was added to each of the mixtures. The consistency was determined by the standard method of the Institute for Lime and Mortar Research, Cologne). The results are presented in Table X.

TABLE X

| Sample | Swelling volume (ml) | Consistency (cm) |
| --- | --- | --- |
| Blank | 0 | 16.1 |
| bentonite A | 4.5 | 15.8 |
| bentonite B | 25 | 15.0 |
| bentonite C | 73 | 14.6 |
| hectorite | 23 | 15.1 |

The higher the swelling of volume of the bentonite, the less the consistency, i.e., the greater the non-sag ability.

Bentonite A with low swelling volume was less effective than bentonite B and C with high swelling volume. Bentonites with a swelling volume of <5% showed no improvement of the processing features. Hectorite also produced an improvement in the processing features.

Example 11

One part Portland cement and 3 parts sand were mixed with 5 wt. % of bentonite A, B and C and adjusted to the same workability with different amounts of water. Mortar swatches 1 m long, 15 cm wide and 1.5 cm high were smeared on a gypsum plaster board and allowed to harden one week. The number of cracks was then determined.

The results are presented in Table XI.

TABLE XI

| Sample | Swelling of volume ml | Water required (%) | No. of Cracks |
| --- | --- | --- | --- |
| Blank | 0 | 20 | 0 |
| bentonite A | 4.5 | 21 | 2 |
| bentonite B | 25 | 25 | 2 |
| bentonite C | 73 | 34 | 18 |
| Hectorite | 23 | 24 | 2 |

The higher the swelling volume of a layer silicate, the greater the need for additional water during the preparation and the larger the number of cracks occurring upon hardening.

Thus, layer silicates with low swelling volume were preferable when the quantity of additives was high and the application was crack-sensitive. This limited the use of layer silicates with high swelling volume, although a high swelling volume has a positive impact on the non-sagging ability (see Example 10). For use in the field of construction, therefore, a definite range of swelling volume should be maintained.

We claim:

1. A mineral binder system, especially for the construction industry, comprising a mineral binder and a supplementing agent in dry powder form, wherein the supplementing agent comprises a finely divided, swellable layer silicate and an additive, wherein the percentage of swellable layer silicate in the supplementing agent is more than about 60 wt. % and the swelling volume of the layer silicate is about 5–50 ml, when measured in terms of a suspension of 2 g of the layer silicate in 100 ml water and wherein the percentage of the supplementing agent in the mineral binder system is about 0.01–5.0 wt. %, in terms of the total solids content of the mineral binder system.

2. The mineral binder system of claim 1, wherein the percentage of the supplementing agent in the mineral binder system is about 0.01–3.0 wt. % in terms of the total solids content of the mineral binder system.

3. The mineral binder system of claim 1, wherein the percentage of the supplementing agent in the mineral binder system is about 0.01–0.9 wt. % in terms of the total solids content of the mineral binder system.

4. The mineral binder system of claim 1, wherein the percentage of the layer silicate in the supplementing agent is more than about 80 wt. %.

5. The mineral binder system of claim 1, wherein the swellable layer silicate is a natural or synthetic swellable layer silicate selected from the group consisting of bentonite, montmorillonite, hectorite, saponite, beidellite and sauconite.

6. The mineral binder system of claim 1 wherein the additive is an extender silicate, selected from the group consisting of vermiculite, illite, mica, pyrophyllite, talc and kaolin.

7. The mineral binder system of claim 1, wherein the supplementing agent has a swelling volume of about 5–40 ml, when measured in terms of a suspension of 2 g. of the supplementing agent in 100 ml of water.

8. The mineral binder system of claim 1, wherein the additive is selected from the group consisting of surfactants, air pore formers, liquefiers, accelerators, retarders, water retention agents, sealing compounds, hydrophobing agents and shrinkage reducers.

9. A process for production of a mineral binder system comprising combining an additive with a swellable layer silicate to form a supplementing agent, and combining the supplementing agent with a mineral binder to form the mineral binder system and wherein the percentage of the supplementing agent in the mineral binder system is about 0.01–5.0 wt. %, in terms of the total solids content of the mineral binder system, and wherein the supplementary agent has a swelling volume of about 5–40 ml when measured in terms of a suspension of 2 g. of the supplementary agent in 100 ml of water.

10. The process of claim 9, further comprising activating the layer silicate by kneading the layer silicate with alkaline ions, mixing the additive with the layer silicate to form a mixture and drying that mixture.

11. The process of claim 9, further comprising activating the layer silicate by alkaline activation, mixing the additive with the activated layer silicate to form a mixture and drying that mixture.

12. The process of claim 9, further comprising subjecting the layer silicate to ion exchange with divalent or trivalent cations, wherein the layer silicate comprises a high swelling sodium bentonite.

13. The process of claim 9, wherein the layer silicate comprises a previously dried, alkaline-activated and ground-up layer silicate.

14. The process of claim 11, further comprising activating the layer silicate by mixing dry powders of the activated layer silicate with the additive.

15. The process of claim 9, further comprising mixing the additive with the layer silicate to form a mixture, wherein the total water content of the mixture is not more than about 50 wt. %, and drying the mixture to a water content of no more than about 20 wt. %.

16. The process of claim 9, wherein the percentage of the layer silicate in the supplementing agent is more than about 80 wt. %.

17. The process of claim 9, wherein the swellable layer silicate is selected from the group consisting of bentonite, montmorillonite, hectorite, saponite, beidellite and sauconite.

18. The process of claim 9 wherein the additive is an extender silicate selected from the group consisting of vermiculite, illite, mica, pyrophyllite, talc and kaolin.

19. The process of claim 9, wherein the additive is selected from the group consisting of surfactants, air pore formers, liquefiers, accelerators, retarders, water retention agents, sealing compounds, hydrophobing agents and shrinkage reducers.

* * * * *